Patented Oct. 23, 1951

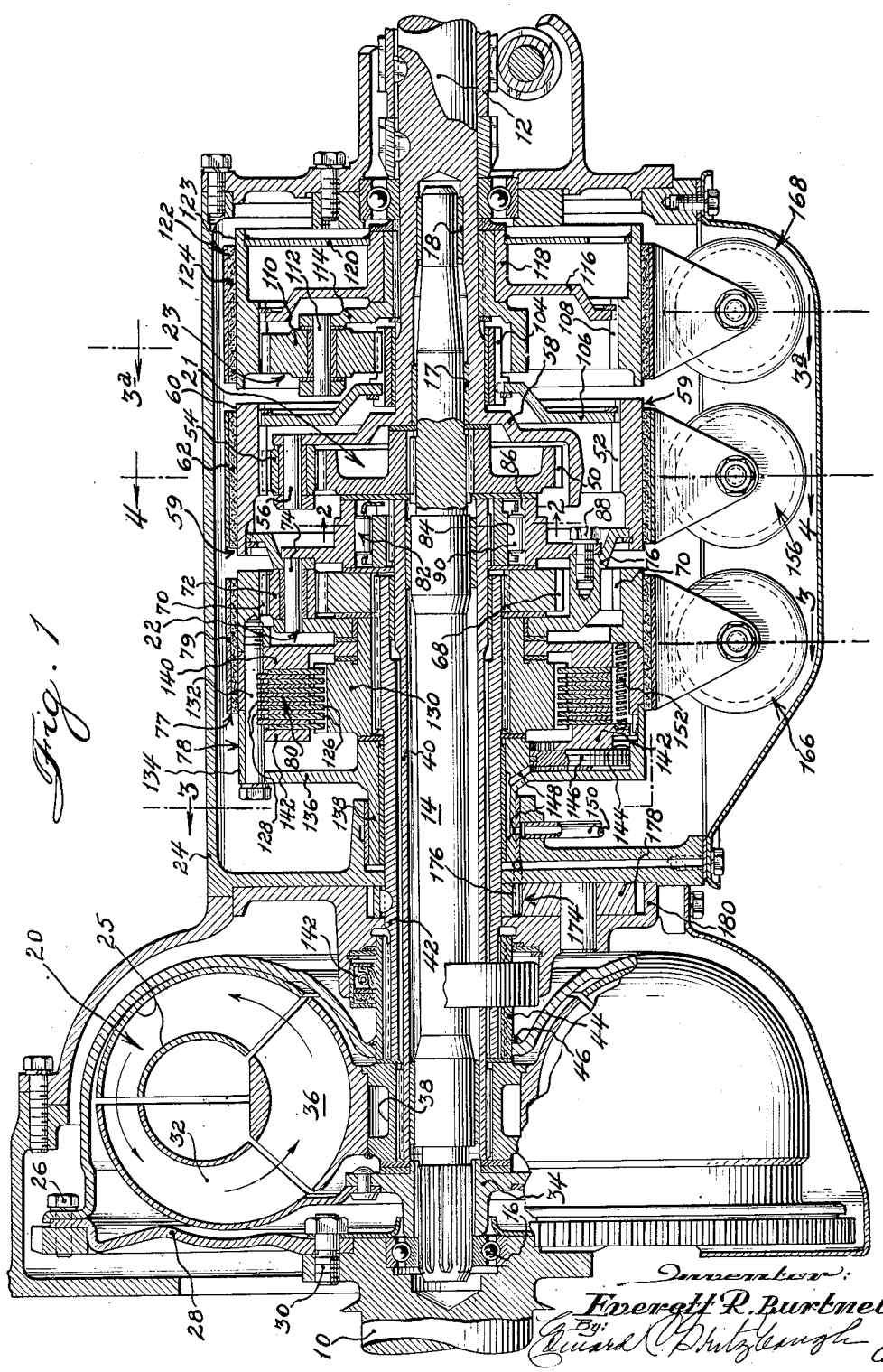

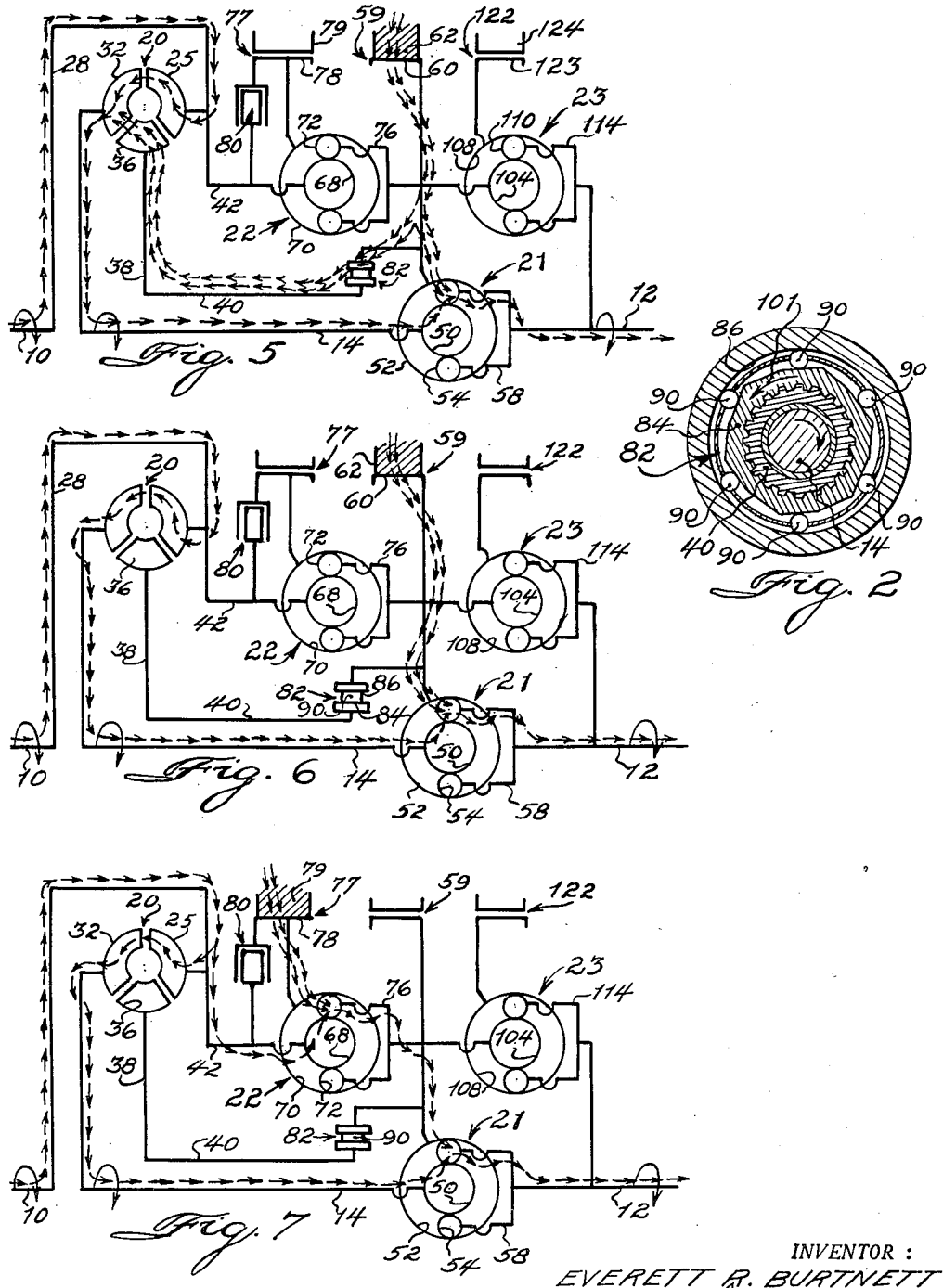

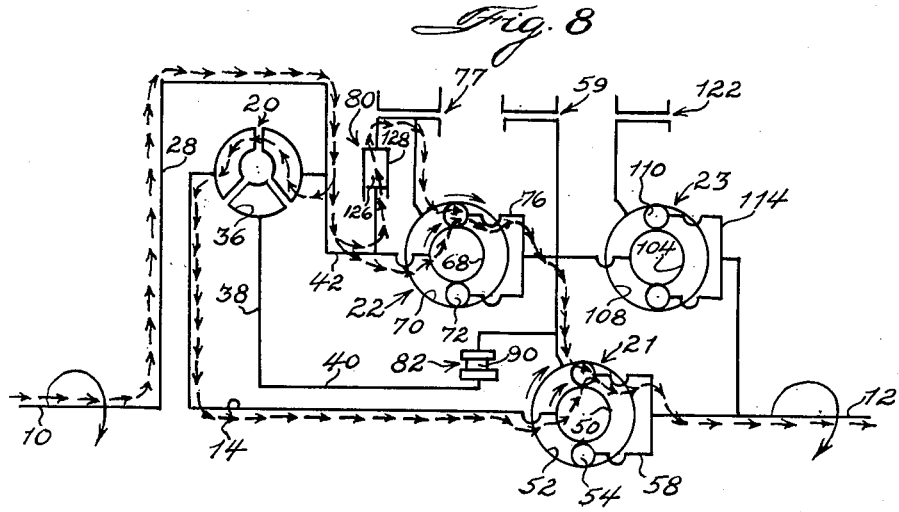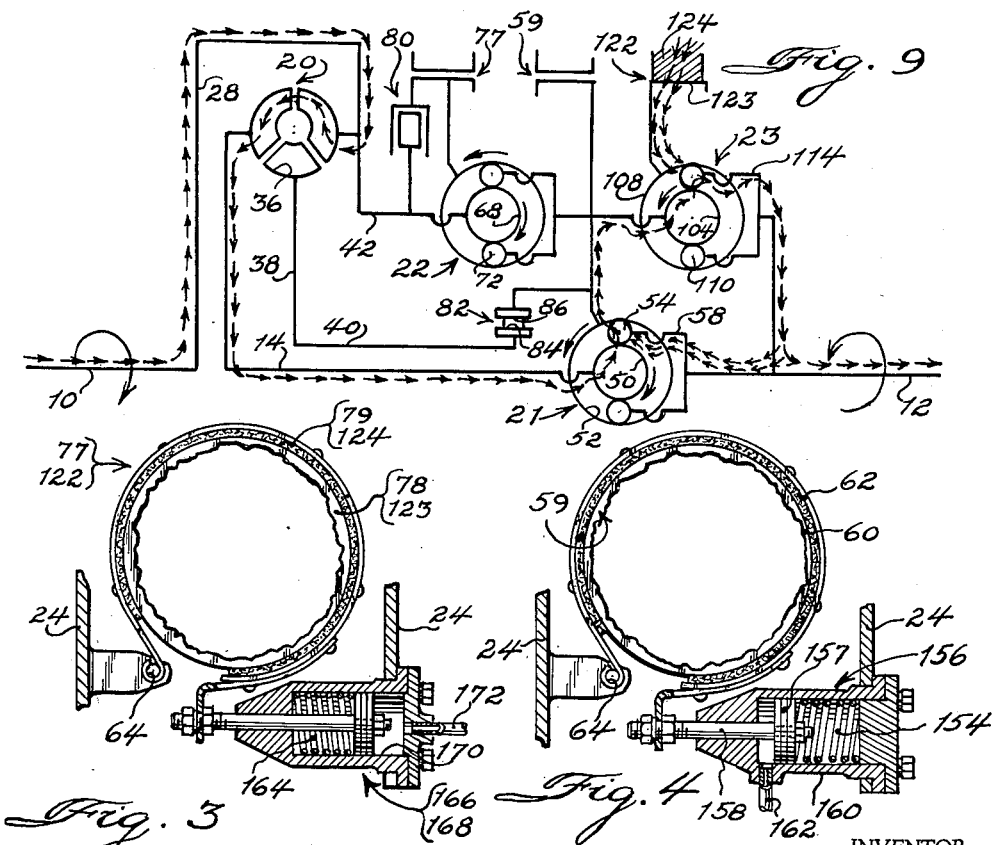

2,572,007

UNITED STATES PATENT OFFICE 2,572,007

VARIABLE-SPEED AND TORQUE TRANSMISSION MECHANISM

Everett R. Burtnett, Inglewood, Calif., assignor to Borg-Warner Corporation, Chicago, Ill., a corporation of Illinois Application February 1, 1946, Serial No. 644,719

12 Claims. (Cl. 74—732)

1

This invention relates to a variable speed and torque transmission of power from a prime mover to an operating shaft, sometimes referred to as the driven, the output, or the load shaft, of the type particularly adapted for use in automobiles and the like; and relates to drive mechanisms which include a hydrodynamic transmission unit adapted to function either as a torque converter of the reaction type or as a fluid coupling, and combined with a mechanical type, variable ratio transmission system to give a plurality of forward speeds and a reverse drive between the input and output shafts.

The invention is more particularly directed to change speed transmissions incorporating a hydrodynamic type drive mechanism adapted to function either as a torque converter or as a fluid coupling and a plurality of epicyclic gear trains adapted to be differentially established to yield selection of different ratios for converting the torque, wherein the overall arrangement is for the torque output of the hydrodynamic transmission unit to be compounded by either of the different torque converting ratios of the epicyclic gearing whereby, a multiplied torque value obtained in the hydrodynamic transmission unit and compounded by the primary torque multiplying ratio in the epicyclic gearing will yield the highest torque, lowest speed ratio of the combination and which compounded arrangement of power transmission systems will transitionally change to the intermediate driving speed, ratio and the constant rate, multiplying the torque yield of speed reduction in the gear exclusively, in response to gradual change in the hydrodynamic transmission unit from torque converting function to operation as a fluid coupling.

The principal object of the invention is to provide such a mechanism of improved combination, forms and arrangement wherein a multiple speed gearing group is coupled with a fluid coupling or torque converter adapted to be driven from a power source in such a manner that a low gear ratio drive may be obtained initially through a power train which derives all of its torque directly from the turbine element of the torque converter and secondly for series-compounding multiplication of the torque in a first portion of the gearing forming the primary gear ratio to form the high torque first speed range coupling between the input and output shafts. Thirdly, for torque multiplying gear ratio in a second portion of the gearing drivingly parallel to the hydraulic torque converter to divide the input torque therewith and for recombination of the divided torque

2 in said first portion of the gearing before delivery to the output shaft to form the second infinitely variable torque speed range coupling the input and output shaft. Fourthly, for selected coupled condition of a portion of the gearing while continuing the division of input torque with the hydrodynamic transmission unit and also the recombining of the divided torque in said first portion of the gearing to form a still higher driving speed coupling the input and output shaft, so as to obtain higher efficiencies in the fluid turbines forming the hydrodynamic transmission unit adapted to function either as a torque converter or fluid coupling and a wide range of infinitely variable rate multiplication of the torque contributing to which the hydraulic torque converter is more sensitive to variations in the load with respect to operating as a fluid coupling.

In obtaining the preceding object, the invention has as a further object the provision in the multiple speed gearing component of a plurality of epicyclic gear trains of the type including an annulus gear such as a ring or internal gear, wherein the primary input elements to torque converting ratio, respectively, of a plurality of the epicyclic trains are separated for rotation relative to each other; further, wherein such gear trains are compounded in parallel to form a differential gear mechanism between the relatively rotatable primary input gear elements of respective of said plurality of trains at the input point and the planet carrier of the final driven one of the plurality of such gear trains at the load shaft point, thus to obtain recombining of the torques of said relatively rotatable input elements of the different gear trains before delivery to the load shaft; and still further, wherein the primary input element of the final driving gear train is connected to be driven from the primary input shaft through the medium of the hydrodynamic transmission unit. The independently rotatable primary input element of other of such plurality of epicyclic gear trains being connected to be driven from the primary input shaft independently of and parallel to the hydrodynamic transmission unit, so that torque conversion driving on the part of additional of the compounded plurality of epicyclic gear trains, augments the driving on the part of a first portion of the plurality, and results in division of the primary input torque with the hydrodynamic transmission unit. A particular advantage is better distribution of the forces and allowing the hydrodynamic torque converter to attain 1 to 1 ratio under higher torque and load resistance conditions in conjunction with an established state of the gearing to yield speed reducing ratio for an intermediate speed driving range. In addition, such provision of the multiple speed plurality of gear trains lends itself to simpler and less costly means for control thereover.

In providing the multiple speed gearing component, a more specific object of the invention is to arrange the elements of the first portion, which is adapted for selection either to high rate multiplication of all the torque delivered wholly through the hydraulic torque converter or to recombine the torque divided between the latter and the torque converting ratio of a second portion of the gearing before delivery to the output shaft, so that the sun pinion gear acts as the primary input element to torque multiplication ratio therein, and so that the annulus gear serves as the reaction element, with the compound advantages of the low pitch line velocity of the sun pinion gear handling the high torque output of the hydraulic torque converter, and the complying pitch line contacts of the annulus gear with the planetary pinions handling the still higher value reaction torque, and the desired speed reduction obtained from this relationship within a low overall diameter of the unit.

In conjunction with the last preceding object, another more specific object of the invention is to provide the second portion of the multiple speed gearing, the torque converting ratio of which is adapted to divide the input torque with the hydraulic torque converter, with arrangements such that the sun pinion gear, which is directly connected to the input shaft parallel to the hydraulic torque converter, acts as the primary input element to torque converting ratio in this portion of the gearing, and so that the annulus gear serves as the reaction element, with the same compound advantages as recited in connection with the last preceding object, plus the advantage of a lower speed underdriving gear ratio from the combination of the torque converting ratio of this portion and the differential ratio effect on final output speed by the first portion of the gearing acting to recombine divided torque.

Another object of the invention is to provide a fluid turbine torque converter and a multiple speed ratio gearing power transmitting system in which full engine torque will be delivered through the fluid torque converter driving a high rate multiplication gear ratio for the torque, with which alternately in connection with obtaining another gear ratio for connecting the engine and the load a portion of the engine torque will be delivered through a torque multiplying gear ratio arranged drivingly in series-parallel coupling with the fluid torque converter for the latter to deliver only the remaining portion, and in which reaction for the hydraulic circuit of the fluid turbine torque converter will be sustained through the same one-way coupling either by reaction brought into play for the gear which is adapted to multiply the full engine torque delivered through the fluid torque converter, or by reaction brought into play for the gear which is adapted to multiply a portion of the engine torque parallel to the fluid torque converter, with advantages of simplicity of connections, and in control apparatus for selection to one-way reaction conversion in the fluid turbine power transmission unit either of the full engine torque or only a portion.

Another object of the invention is to provide a power transmitting system including a fluid turbine torque converter with which the alternate applications of a plurality of separate reaction braking units, such as contractable and releasable brake bands, will, by selection, condition the system for delivery of all the engine torque through the fluid torque converter whereby it can function either as a converter or fluid coupling, or for division of the engine torque between the setting of a gear train for multiplying torque and the fluid torque converter while continuing the condition whereby the latter can function either as a converter or fluid coupling, with advantages of control by alternate reaction braking units as to whether the fluid torque converter is apportioned for delivering therethrough the full engine torque or only one portion in conjunction with gear multiplication of the remaining portion.

Another object of the invention is to provide a fluid turbine torque converter and mechanical torque converter drive mechanism which by selection can be controlled so that the reaction member for the hydraulic circuit will be reaction sustained positively at rest or driven at a fixed ratio of reduced speed relative to the speed of the engine by a gear taking torque therefrom through positive drive, with advantages in that when the fluid torque converter is coupled to handle the full engine torque, full reaction will prevail for the hydraulic conversion, and when differentially coupled to handle only a portion of the engine torque, a complying slow speed drive will sustain reaction for the hydraulic conversion.

Another object of the invention is to provide a drive mechanism in which, upon establishing connection at a given point for reaction sustaining, a given gear ratio of drive the mechanism will be conditioned drivingly to result in series-parallel splitting of the input torque between an all mechanical power transmitting train effective to multiply a portion of the torque in a gear therein, and a fluid turbine unit the fluid drive component of which, upon sufficient speed of rotation of the fluid driving turbine wheel will take and multiply the remaining portion, with advantages of selection for a hydrodynamic power transmission unit to multiply only a portion of input torque for delivery through the mechanism.

Another object of the invention is to provide a drive mechanism in which upon selectively establishing connections for reaction sustaining gear drive at a given point, the mechanism will be conditioned for an all mechanical power transmitting train to take and multiply a portion of the torque of an input shaft with the result that the hydraulic circuit of a hydrodynamic power transmission unit adapted to function either as a torque converter or fluid coupling will, upon sufficient speed of rotation of the input shaft, take and deliver the remaining portion, with advantages of selection for a hydrodynamic power transmission unit, adapted either to multiply or non-multiply the torque in transmission therethrough, to be apportioned only a sub-ratio of the full input torque.

Another object of the invention is to provide a fluid torque converter and mechanical power transmitting mechanism combined with a connection where sustaining of reaction for conversion of torque in a gear can take place, and further combined with a clutch unit, such that utilizing said connection, the gear taking and multiplying only a portion of the input torque will apportion and depend upon the fluid torque converter taking and delivering the remaining portion, and such that an engaged condition of the clutch for conditioning the mechanism to yield a different driving speed range will establish a direct drive effective parallel to the fluid torque converter, with advantages of selection drivingly to circumvent a fluid torque converter by either gear effected multiplication, or direct drive delivery of torque.

With respect to the last preceding object, in a broader aspect another object of the invention is to provide a drive mechanism including a fluid turbine system adapted to function either as a torque converter or fluid coupling combined with a mechanical type of torque converter arranged drivingly in parallel therewith, and in which reaction at a given point for a ratio of gear drive, the mechanism will be conditioned for a portion of the input torque to be multiplied in a gear and for delivery of the remaining portion through the fluid drive of the turbine system, and alternately as a result of an engaged condition of a clutch unit, substituting for the effect of the reaction at said given point, the mechanism will be condition for a greater portion of the input torque to be transmitted parallel to the turbine system, and for the fluid drive of the latter to deliver the accordingly lesser portion, with advantages of selection, the fluid turbine system being enabled infinitely to vary between maximum conversion and 1 to 1 ratio, when coupled, to take only a portion of the input torque, or limited to function solely as a fluid coupling when coupled to take only a lesser portion.

In a broad aspect another object of the invention is to provide a drive mechanism in which changing the condition for drive therethrough, of all mechanical connections providing a multiple speed ratio torque path parallel to a first torque path which includes the hydraulic circuit drive coupling component of a system of turbine wheels adapted to function either as a fluid torque converter or fluid coupling, is accomplished by the alternate engagement of one or another of a plurality of units of frictionally engaging elements, wherein at least one such effected change will result in changing the ratio with respect to the full input torque which said hydraulic circuit will be required to transfer, and wherein said change will also include a differential operation with respect to the connections whereby the hydraulic circuit will either be sustained to function as a torque converter as well as a fluid coupling, or will be coupled to function solely in the latter capacity.

Another object of the invention is to provide a drive mechanism in which shifting the point of reaction from that for a given gear ratio for reducing speed to that to sustain another gear ratio for reducing speed is accomplished by alternately engaging one unit or another unit of frictionally engaging elements, and at the same time will result in connections for the drive from those which will require the transfer of a given proportion of the full input torque to those which will require the transfer of a different ratio proportion by the hydraulic circuit of a system of turbine wheels, while in conjunction with the establishment of either of said speed reducing gear ratios providing connections whereby said hydraulic circuit is adapted to function either as a torque converter or fluid coupling, with advantages in that shifting between alternate of a plurality of different gear ratio speed reducing driving ranges in each of which infinitely variable rate multiplying of the torque governed by the fluid turbine drive is accomplished without necessarily interrupting either the input or the output torque.

Another object of the invention is to provide a drive mechanism in which a system of turbine wheels is combined with controls such that the hydraulic circuit of a system of turbine wheels is enabled infinitely to vary between maximum ratio conversion and 1 to 1 ratio transmission when by selection of the mechanism in different settings, the turbine wheels are coupled for the hydraulic circuit to handle either the full driving torque or only a portion of the full torque divided by a gear, with advantages in greater range differential of torque driving the load shaft.

Another object of the invention is to provide a drive mechanism in which a system of turbine wheels, the hydraulic circuit of which is adapted to function either as a torque converter or fluid coupling, is combined with a multiple speed gearing, and with a plurality of units of engageable elements such that the engagement of a given unit of elements and successively the engagement of another unit of elements, respectively, for changing the multiple speed gearing from a given ratio to a higher speed ratio and successively from said higher speed ratio to a still higher speed ratio will secure division of the input torque imparted to the fluid driving wheel of the turbine system for the hydraulic circuit to handle only a portion, and successively a lesser portion, with advantages in yielding scalar ranges of efficiencies of the fluid turbines so combined and adapted to function either as a torque converter or fluid coupling proportional to its handling the full torque imparted to its fluid driving member in a selected low driving speed range, handling only a portion in a selected intermediate speed driving range, and handling a lesser portion in a selected still higher driving speed range.

Another object of the invention is to provide a drive mechanism in which as a result of establishing reaction, for a gear to take and multiply only a portion of input torque drivingly parallel to a fluid turbine torque converter coupled to take and either multiply or transmit at 1 to 1 ratio the remaining portion, a coupling of two relatively rotatable elements for recombining divided torque before delivery to a load shaft will operate to rotate the latter at an infinitely variable differential of speed resulting from the reduced speed of rotation of one of the two elements and the infinitely variable rotation of the other of the two elements by the fluid turbine drive as it varies between maximum conversion and 1 to 1 ratio delivering said remaining portion of the input torque, with advantages in greater flexibility in changing speed and torque driving ratio responsive to variations in torque and load.

Another object of the invention is to provide a drive mechanism which includes a hydrodynamic power transmission unit adapted to function either as a torque converter or fluid coupling, combined with a system of all mechanical power transmitting connections providing a torque path parallel to the hydrodynamic transmission unit connecting the engine shaft and a driven shaft and adapted for positive drive connection with the road wheels of a vehicle, in which for parking the vehicle in gear to utilize the compression of the engine as a brake, and said all mechanical connections can be established positively effective to urge rotation of the engine shaft at a greater speed ratio than that of the driven shaft upon any tendency of the latter to act as the driving member under the influence of any tendency of the vehicle to move in either direction.

Other objects and advantages of the invention will appear from the following description in the course of which reference is had to the drawings, in which:

Fig. 1 is a vertical, longitudinal, axial sectional view through an embodiment of the invention;

Fig. 2 is a sectional view taken on line 2—2 of Fig. 1 showing the details of a one-way coupling;

Figs. 3 and 4 are fragmentary, sectional views taken generally on the lines 3—3 and 4—4 of Fig. 1 showing certain details of brake and brake actuating mechanisms;

Fig. 5 is a diagrammatic view of the torque transmission and reactance paths obtaining during the primary speed and torque ratio range for initiating the vehicle in motion, a single line of arrows indicating the torque path, and the double line of arrows indicating the reactance paths;

Fig. 6 is another diagrammatic view indicating the power flow and reactance paths obtaining during the second speed and torque ratio; under these conditions the hydraulic transmission unit is functioning as a fluid coupling;

Fig. 7 is another diagrammatic view indicating the power flow and reactance paths obtaining during the third speed and torque ratio range;

Fig. 8 is another diagrammatic view indicating the power flow paths obtaining during a direct drive fourth speed range; and Fig. 9 is still another diagrammatic view indicating the power flow and reaction paths obtaining during reverse drive.

With reference now to the drawings, it may be noted that the mechanism of the present invention connects a driving shaft 10 to a driven shaft 12. The driving shaft 10 is the power or torque input member and may be the engine crankshaft or may be connected with a suitable source of power. The driven shaft 12 is the output member or may be referred to as the operating or load shaft and may be connected to propel a load, such as with the driving wheels of a motor vehicle (not shown). An intermediate shaft 14 is arranged in axial alignment with and between the input shaft and the output shaft. It is rotatably supported by a bearing 16 carried in a recess formed in the driving shaft and bearings 17 and 18 carried in a recess formed in the driven shaft 12.

The system of the present invention includes a hydrodynamic transmission unit 20 operable either as a torque converter or as a fluid coupling and a pair of epicyclic gear trains or units 21 and 22 selectively controllable to provide a plurality of forward speed and torque driving ratios. The system disclosed by the accompanying drawings illustrating one embodiment of the present invention further includes a third epicyclic gear unit 23 utilized in reverse drive. These elements are all mounted within a housing 24 secured in suitable manner to a vehicle.

The hydrodynamic transmission unit consists of an impeller or pump member 25 fixed to the input shaft by bolts 26, a disc 28 secured by bolts 30 to the input shaft; a driven turbine wheel or runner 32 having a hub 34 splined to the forward end of the intermediate shaft; and a vaned reaction member or wheel 36 having a hub 38 splined to a first tubular or sleeve shaft 40 which encircles an intermediate portion of the intermediate shaft 14 and is rotatable independently of the latter. A second tubular shaft 42 surrounding the assembly of shafts 14 and 40 and independently rotatable relative thereto is fixedly connected for rotation with the driving shaft. It is splined at its forward end to a hub 44 secured, as by welding, as indicated by reference character 46, to the pump member 25, which is secured to the driving shaft.

The planetary gear set 21 is coupled to the driven shaft 12. It includes a sun gear 50 splined to the intermediate shaft 14, an internal ring gear 52, and a series of planet pinions 54, each in mesh with the sun and ring gears and mounted for rotation around their respective axes on pins 56. The pins are supported by an output planet carrier 58 which is fixedly secured for rotation with the output shaft.

The ring gear 52 of planetary gear unit 21 is selectively restrained against rotation in the first two forward speeds, i. e., the variable speed ratios obtaining in accordance with variation in driving effect on the part of the hydrodynamic transmission unit, more particularly, whether operating as a torque converter or as a fluid coupling, by brake means 59 including a brake drum 60 and a brake band 62 anchored to the housing 24 (see Fig. 4) as indicated by reference character 64. The drum is preferably formed at the outer surface of ring gear 52.

The secondary planetary gear set 22 of the pair of epicyclic gear trains used in the forward speeds receives its input power from the input shaft 10 independently of the hydrodynamic transmission unit, and it is arranged to drive primarily the ring gear 52 of the epicyclic gear train 21. The second gear set comprises a sun gear 68 splined to the outer tubular shaft 42, a ring gear 70, and a series of planetary pinions 72 mounted to rotate around their own axes on pins 74. These pins are supported by a planet carrier 76 which is splined to the ring gear 52 of set 21.

The planetary gear unit 22 is selectively rendered effective to couple the driving shaft to the ring gear 52 of planetary gear unit 21 upon restraint of rotation of the ring gear 70 or upon the coupling of ring gear 70 to the driving shaft, or more particularly to the tubular shaft 42.

The ring gear 70 is selectively restrained against rotation by a brake 77 including a brake drum 78 preferably formed at the outside of the ring gear 70 and a brake band 79.

The planetary gear unit 22 is adapted to rotate the ring gear 52 of planetary gear unit 21 at engine speed when the ring gear 70 of the former is connected to the shaft 42. The ring gear 70 is adapted to be connected to the shaft by a clutch indicated as a whole by reference character 80 and which will be described in greater detail hereinafter.

The selective operation of the brake 77 and clutch 80 establishes and controls the proportion of torque transmitted in parallel with the hydrodynamic transmission unit through the planetary gearing 22. When the brake 77 is engaged, subsequent to disengagement of brake 59, torque is transmitted at a multiplied rate obtaining in unit 22 from the driving shaft 10 first to the ring gear 52 of gear unit 21 and thence through the planet pinions 54 to the driven shaft while a portion of the torque is transmitted through the hydrodynamic unit 20 first to the sun gear 50 of the gear unit 21 and thence through the planet pinions 54 to the driven shaft. When the clutch 80 is engaged and the brake 77 disengaged, the planetary gear unit 22 is rotated at engine speed due to locking of sun 68 to ring gear 70 with the result that ring gear 52 is rotated at engine speed. As a result, the driven shaft 12 is rotated at higher speed, more particularly at substantially engine speed because both the sun and ring gears of unit 21 are rotated through direct drive ratio from the driving shaft, the sun gear 50 through the hydrodynamic unit acting as a fluid coupling and the ring gear 52 through the locked planetary gear unit 22.

As heretofore indicated, the hydrodynamic transmission unit 20 operates either as a torque converter or as a fluid coupling. It is operatively connected to the planetary gear unit 21 in such manner that the driven element 32 drives the sun gear and the reaction element 36 drives the ring gear 52, preferably through a one-way clutch 82. The clutch 82 is disposed between the central tubular shaft 40 and ring gear 52 (and also brake drum 60 of unit 21 and planet carrier 76 of unit 22). The one-way coupling restricts backward rotation, i. e., backward rotation imparted to member 36 by the fluid being expelled from the forward drive rotating turbine wheel 32. The backward rotation is prevented by the clutch 82 and either the brake 59 or the forward drive of the planet carrier 76, which occurs when brake 77 is engaged and brake 59 disengaged.

The one-way clutch 82 comprises an externally cammed hub or inner member 84 splined to the rear end of shaft 40, a concentric outer member 86 having an inner bearing race and fixedly secured to the planet carrier 76 by cap screws 88, and a plurality of roller clutch members 90 disposed between the inner and outer clutch members as best illustrated in Fig. 2. The previously referred to backward direction of rotation of the reaction element 36 is indicated by the arrow 101 in this figure.

The third epicyclic gear unit 23 utilized in reverse drive is located immediately to the rear of unit 21. It includes a sun gear 104 fixed for rotation with the ring gear 52 of the gear unit 21 by a disc 106 splined to rotate with both the ring gear 52 and sun gear 104. It includes also a ring gear 108, and a series of planet pinions 110 mounted to rotate around their respective axes on pins 112, supported by a planet carrier 114 splined to output shaft 12.

The ring gear 108 is rotatably supported by a disc 116 having a hub 118 surrounding the axially extending portion of the planet carrier 114. The peripheral portion of the disc 116 is splined to the ring gear and the ring gear is additionally secured to the disc by a plate 120 welded to the gear and to the hub 118.

The rotation of the ring gear 108 of the reverse planetary unit 23 is restrained to render the reverse drive effective. It is restrained by a brake indicated as a whole by reference character 122 and including a brake drum 123 formed at the exterior of the ring gear 108 and a brake band 124 secured to the housing 24, in a manner also indicated in Fig. 3.

The clutch 80 to which brief reference was had earlier, includes a plurality of relatively movable clutch plates 126 and 128, the former of which is connected to rotate with the outer tubular shaft 42 and the latter of which is connected to rotate with the ring gear 70 of planetary gear unit 22. The clutch plates 126 are splined to a hub 130 surrounding and splined to the shaft 42. The clutch plates 128 are, in effect, splined to bolts 132 secured to the ring gear 70 and which bolts secure to the ring gear, side and end plates 134 and 136, the latter of which has a hub 138. The clutch includes also a stationary bottom plate 140 and a movable forward clutch plate 142, both connected to rotate with the ring gear 70.

The clutch is adapted to be engaged when the movable clutch plate 142 is moved toward the stationary clutch plate 140. The movable plate is actuated preferably by hydraulic means including a series of cylinders 144 (only one of which has been illustrated) inside of which are located pistons 146. The pistons are moved in clutch engaging direction when fluid pressure is admitted to the cylinders through the conduit 148 in the closure plate 136 and a pipe 150 which may be connected to a suitable source of fluid pressure to be described shortly. The clutch is normally maintained in its disengaged condition by a plurality of springs 152.

The brakes may be actuated by suitable means. For example, fluid actuated means such as those illustrated in Figs. 3 and 4 may be utilized. It is preferred that the brake 59 be normally engaged, thereby conditioning the mechanism to initiate the forward low speed ratio. The brake band 62 is normally maintained in braking engagement with the brake drum 60 by a spring 154 (see Fig. 4) forming part of brake actuating means 156 and operatively connected to the brake band through a piston 157 and a rod 158. The piston and spring are mounted within a cylinder 160 within which fluid may be supplied under pressure through a conduit 162.

The brakes 77 and 122 are preferably normally disengaged by springs 164 (see Fig. 3) forming part of the brake actuating means 166 and 168 associated with the two brakes respectively. The pistons and springs are mounted within cylinders 170 supplied with fluid through conduits 172.

The fluid pressure can be provided by a pump 174 consisting of a pinion gear 176, keyed to the shaft 42 whereby it may rotate with the primary input shaft 10, and a driven gear 178, both of which are contained in a housing 180.

The output side of the pump is suitably connected to the various conduits leading to the brake and clutch actuating pistons heretofore described.

The operation of the system will now be described, the various operating sequences being taken up in order:

*Neutral*

A neutral condition obtains when the three brakes 62, 77, 122 and clutch 80 are disengaged. Under these conditions, the sun gears 50 and 68 of planetary gear units 21 and 22 will be rotated through the hydrodynamic transmission device and the tubular shaft 42, respectively. However, no appreciable torque is transmitted to the driven shaft, the various gears of the planetary gear units being idly driven.

Alternatively, the brake 59 may be, as heretofore indicated, normally engaged. Even under these conditions, no substantial torque is transmitted to the driven shaft 12 until the engine is accelerated above its idling speed. Some torque would however be transmitted to the driven shaft, this constituting a slight drag resulting from the low rate of circulation of working fluid in the hydrodynamic transmission unit.

*Starting or first forward speed range*

The system is conditioned for a first or starting forward speed by the engagement of the brake 59, as indicated in Fig. 5. Under these conditions the ring gear 52 of the planetary gear unit 21 is prevented from rotating and reaction is applied in the reaction element 36 of the hydrodynamic transmission unit thereby effecting operation of the latter as a torque converter. The driving shaft torque is thus multiplied through the unit 20 to the sun gear 50 with the result that the planetary carrier 58 and driven shaft 12 are rotated in the forward driving direction of the vehicle. The reaction element 36 of unit 20 is prevented from rotating backward by the one-way clutch 82 now acting as a brake, the latter in turn securing reaction at the engaged brake 59.

As heretofore explained, no appreciable drive other than a slight dragging effect occurs until the engine is accelerated sufficiently above idling speed to provide an effective transmission of torque through the unit 20.

Initially the torque transmitted through the hydrodynamic transmission unit 20 may obtain multiplication therein approximating 1.0 to 1.5 ratio, and sequentially will approach 1.0 to 1.0 ratio either as the speeds of the driving and driven members increase, or upon a sufficient reduction in the ratio of the load resistance relative to the primary torque, or upon a division of the torque taking place resulting from the application of the brake 77. Assuming, by way of example, a gear reduction ratio of 2.454 to 1.00 obtaining between the sun 50 and the carrier 58, secured when the ring gear 52 is held stationary, the multiplied torque ratio for initiating rotation of the driven shaft 12 will attain a value between 1.00 to 2.454 and a maximum of approximately 1.00 to 3.67.

Second forward speed

The second forward speed may be made to take place automatically simply by maintaining brake 59 engaged until the unit 20 operates as a fluid coupling, as indicated above, this drive being illustrated in Fig. 6. When this occurs, the reaction member 36 overruns in the one-way coupling 82. Under the assumed conditions, a second speed of about 2.454 to 1.00 ratio can be obtained from the continued drive through the gear unit 21 alone and which unit also multiplies the torque.

Third forward speed

To condition the system for forward operation at a third speed, the brake 59 is released and brake 77 engaged, as illustrated in Fig. 7, thereby to place the gear unit 22 in operation to drive the ring gear 52 of unit 21, the fluid drive continuing to rotate the sun gear 50 of unit 21.

In the third forward speed the drive from the driving shaft to the driven shaft extends through two parallel paths, one comprising the original path through the hydraulic transmission unit and the other including the gear unit 22. The torque is combined in the planet pinions 54 and transmitted to the driven shaft through the planet carrier 58.

Thus it will be seen that the application of the second brake coincident with release of the first brake shifts the position and ratio of reaction and will result in the division of the torque within the hydrodynamic transmission unit. Assuming that the reduction ratio of the gear unit 22 is also approximately 2.454 to 1.00, as between the sun gear 68 and carrier 76 obtaining when the ring gear 70 is held stationary, then the reduction in third speed will be approximately 1.55 to 1.00.

Fourth forward speed

The fourth forward speed is a direct drive, and it is placed into effect by the release of brake 77 and the engagement of clutch 80, as indicated in Fig. 8. When the clutch 80 is engaged, the planetary gear unit 22 is locked for unitary rotation and driven at engine speed so that the ring gear 52 of unit 21 is rotated at engine speed and the same is substantially true of the sun gear 50. Power is again transmitted from the driving shaft to the driven shaft through two parallel paths, but by virtue of the stepped-up rotation of the ring gear 52 of unit 21 a lesser percentage of the torque is now transmitted through the hydraulic transmission unit. The drive is substantially a direct drive, although some slippage may occur in the hydraulic transmission unit.

Reverse drive

The system is conditioned for reverse drive by the engagement of brake 122 when the other brakes and clutch 80 are disengaged, as illustrated in Fig. 9. The reverse drive is effected through the hydraulic transmission unit and the planetary gear units 21 and 23, the ring gear of the latter being restrained against rotation by the brake 122. A minor ratio of the reverse drive torque delivered from the planetary gear unit 23 to the driven shaft 12 is absorbed by the planet carrier 58 in providing therein the restraint required to obtain reverse drive of the ring gear 52 of unit 21 relative to the direction of rotation of the sun gear 50 through the planet pinions 54.

Two-way positive drive

The system may be conditioned to provide a two-way positive drive between the input shaft comprising the outer tubular shaft 42 and the impeller 25 of the hydrodynamic transmission unit connected to the vehicle engine crankshaft 10 and the output shaft 12, which is adapted for positive drive connection with the driving wheels of the vehicle in a motor vehicle by employing any suitable means of energizing disengagement of brake 59 and simultaneous application of the brakes 77 and 122. Under this condition (restraining rotation of the ring gears 108 and 70) any tendency of the driven shaft 12 and the planet carrier 114 fixed therewith to rotate in either direction will urge the planet pinions 110 to track in the same direction around within the ring gear 108 and thus urge the sun gear 104 to rotate at greater speed than that of the driven shaft 12 in the same direction. In turn, the greater speed urge manifested in the sun gear 104 will also be manifested in the planet carrier 76 fixed therewith and thus tend to urge the planet pinions 72 to track around within the ring gear 70 thereby at a compound ratio urge the sun gear 68 and the vehicle engine crankshaft 10 fixed therewith to rotate at a still greater speed than but in the same direction as the driven shaft 12. Thus it will be seen that in this condition of the epicyclic gearing a two-way positive gear drive ratio is established by which the vehicle may be braked against the vehicle engine compression effectively and independently of the hydrodynamic transmission unit.

It is to be understood that although the invention has been described in connection with a specific embodiment, numerous other applications which will readily occur to those familiar with the art may be made without departing from the spirit thereof, or from the statements of the invention in the appended claims.

Having thus described my invention, what I claim as new and desire to secure by Letters Patent of the United States is:

1. A power transmitting system for interconnecting driving and driven shafts including, in combination, a pair of planetary gear units each including a sun gear, an internal gear, planet pinions, and a planet carrier, means fixedly securing the planet carrier of a first of said units to the driven shaft, means fixedly securing the planet carrier of the second of said units to the internal gear of said first unit, a three element hydrodynamic transmission unit having a driving element fixedly secured to the driving shaft, a driven element fixedly secured to the sun gear of said first planetary gear unit and a reaction element, means including a one-way clutch connecting said reaction element to the internal gear of said first planetary gear unit and to the planet carrier of said second planetary gear unit, means fixedly securing the sun gear of said second planetary gear unit to the driving shaft, and means for restraining rotation of the internal gear of said first planetary gear unit.

2. A power transmitting system for interconnecting driving and driven shafts including, in combination, a pair of planetary gear units each including a sun gear, an annulus gear, planet pinions each in mesh with both the sun and annulus gears of the respective epicyclic gear units, and a planet carrier, means fixedly securing the planet carrier of a first of said units to the driven shaft, means fixedly securing the planet carrier of the second of said units to the annulus gear of said first unit, a three element hydrodynamic transmission unit having a driving element fixedly secured to the driving shaft, a driven element fixedly secured to the sun gear of said first planetary gear unit and a reaction element, means including a one-way clutch connecting said reaction element to the annulus gear of said second planetary gear unit, means fixedly securing the sun gear of said second planetary gear unit to the driving shaft, and means for selectively restraining rotation of said annulus gears.

3. A power transmitting system for interconnecting driving and driven shafts including, in combination, a pair of epicyclic gear units each including a sun gear, an annulus gear, planet pinions each in mesh with both the sun and annulus gears of the respective epicyclic unit, and a planet carrier, said sun gears mounted for rotation relative to each other in either direction; means fixedly securing the planet carrier of the first of said units to the driven shaft, means fixedly securing the planet carrier of the second of said units to the annulus gear of said first unit, a three element hydrodynamic transmission unit including a driving element fixedly secured to the sun gear of said second unit, a driven element fixedly secured to the sun gear of said first unit, and a reaction element, means including a one-way clutch connecting said reaction element to the annulus gear of said first epicyclic unit, selectively operable brake means for restraining rotation of said annulus gears, and selectively operable clutch means between the sun and annulus gears of said second unit for locking the elements of said second planetary gear unit for unitary rotation.

4. In drive transmitting mechanism for motor vehicles, the combination including an engine shaft, a load shaft, an epicyclic gearing group including an input sun pinion gear, an annulus gear and an output planet carrier, the latter coupled to be rotated at a differential of speed resulting from the rotation imparted by said sun pinion and by the rotation imparted by said annulus gear, said output carrier connected to rotate said load shaft, reaction braking means for restraining rotation of said annulus gear, a hydrodynamic power transmission unit including a driving element connected with said engine shaft, a driven element fixedly secured to and rotatable with said sun pinion and a vaned reaction element, means including a one-way coupling device connecting said vaned reaction element to said annulus gear, whereby said hydrodynamic transmission unit may function either as a torque converter obtaining direct sustaining reaction from an engaged condition of said braking means or as a fluid coupling, and multiple speed drive transmitting means in parallel with said hydrodynamic transmission unit and forming means to selectively rotate said annulus gear from said engine shaft either at a reduced speed ratio relative to, or at the same speed as, said engine shaft, whereby to divide the engine shaft torque with said hydrodynamic transmission unit in either of plural higher driving speed ratios connecting said engine and load shafts.

5. In a power transmitting system, the combination including an input shaft, an output shaft, an epicyclic gearing group including a sun pinion gear and an annulus gear, means including a system of planetary pinion gears interconnecting said sun and annulus gears for recombination of their torques to urge rotation of said output shaft at a differential of speed resulting from power rotation imparted to said sun gear at one speed and from power rotation simultaneously imparted to said annulus gear at a speed at variance with that of said sun gear, a second epicyclic gear unit comprising a sun pinion gear fixedly secured with the annulus gear of said gearing group, an output planet carrier rotatable with said output shaft and supporting planetary gears rotatable thereon and in mesh with said sun pinion, and an annulus gear in mesh with the same planetary gears meshing with said sun pinion, reaction braking means for selectively restraining rotation of said annulus gears, a hydrodynamic transmission unit including a driving element connected individually to be rotated by said input shaft, a driven element connected with said sun pinion of the first-named epicyclic gearing group and a vaned reaction element, means including a one-way clutch connecting said reaction element to said annulus gear of the first-named epicyclic gearing group, whereby said hydrodynamic transmission unit may function either as a torque converter obtaining sustaining reaction from an engaged condition of the reaction braking means associated with said annulus gear or as a fluid coupling, multiple speed ratio means in parallel with said hydrodynamic transmission unit and adapted for individually rotating the annulus gear of the first-named epicyclic gearing group from said input shaft in either of a plurality of forward driving speeds each dividing the torque of said input shaft with said hydrodynamic transmission unit, actuation means for said last-mentioned means, and control means for said actuation means arranged to select low and higher speeds of said multiple speed ratio means sequentially and alternately with the braking means associated with said annulus gear of the first-mentioned said gearing group.

6. In a power transmitting system, in combination, a first shaft, a first tubular shaft concentrically encompassing an intermediate portion of said first shaft, a second tubular shaft concentrically encompassing an intermediate portion of said first tubular shaft, said three shafts normally separated for rotation relative to each other, a pair of epicyclic gear units each having a sun pinion gear and an annulus gear and a planet carrier supporting planetary gears rotatable thereon and meshing with both the sun pinion and annulus gears of the respective epicyclic unit, the sun pinions of said gear units being separated for rotation relative to each other, the sun pinion of the first of said epicyclic units rotatable with the inner of said shafts, the sun pinion of the said second epicyclic unit rotatable with the outer said tubular shafts, the planetary carrier of said second epicyclic unit rotatable with the annulus gear of said first epicyclic unit, and means directly connecting the first tubular shaft to the said fixed connection of the planetary carrier of said second epicyclic unit to the annulus gear of said first epicyclic unit intermediate said pair of units.

7. In a power transmitting mechanism, in combination, a first shaft and a first tubular shaft concentrically encompassing an intermediate portion of said first shaft and a second tubular shaft concentrically encompassing an intermediate portion of said first tubular shaft, said three shafts being each free to rotate relative to each other, a planetary gear unit having a sun gear fixedly secured to the outer tubular shaft, and a carrier supporting planetary gears rotatable thereon and in mesh with said sun gear, a second epicyclic gear unit having an annulus gear rotatable with the carrier of said first planetary gear unit and having a sun gear normally free to rotate relative to the sun gear of said first planetary gear unit and the second tubular shaft, said sun pinion of the second epicyclic gear unit secured to the inner shaft, selective reaction braking means effective to hold the planetary carrier of said first planetary gear unit and annulus gear of said second epicyclic gear unit against rotation, means directly connecting the said first tubular shaft to the fixed connection of the planetary carrier of said first planetary gear unit and the annulus gear of said second epicyclic gear unit intermediate said two units, and a hydrodynamic power transmission unit having an impeller element directly connected with said second tubular shaft, said hydrodynamic unit further having a driven turbine element directly connected with the said first shaft and a vaned reaction member connected rotatable at least in one direction with the intermediate tubular shaft.

8. In a power transmitting system, in combination, a pair of epicyclic gear units each having a sun pinion gear, an annulus gear and a carrier supporting planetary gears rotatable thereon and in mesh with both the sun pinions and the annulus gears of the respective epicyclic unit, the planetary carrier of the first of said epicyclic units rotatable with the annulus gear of the second of said epicyclic units, the sun pinion gears of each of said pair of epicyclic units being normally uncoupled and free to rotate relative to each other, three normally uncoupled relatively rotatable concentric shafts comprising an inner first shaft rotatable with the sun pinion of said second epicyclic unit, a first tubular shaft encompassing an intermediate portion of said first shaft and connected to the fixed connection of the planetary carrier of said first epicyclic unit and the annulus gear of said second epicyclic unit intermediate said two units, and an outer second tubular shaft encompassing an intermediate portion of said first tubular shaft and connected to rotate the sun pinion of said first epicyclic unit, a clutch unit, the driving clutch element of which is fixedly rotatable with said outer tubular shaft and the driven clutch element of which is rotatable with the annulus gear of said first epicyclic unit.

9. A variable speed drive mechanism comprising coaxial first and second power transmitting shafts, said second shaft adapted for connection to the load, a power operated fluid torque converter having impeller, reaction and driven members, said driven member being fixed to rotate with said first shaft, a sleeve-shaft mounted to rotate relative to and arranged encompassing an intermediate portion of said first shaft, a one-way coupling the first element of which is fixed to rotate with said sleeve-shaft, said sleeve-shaft and one-way coupling forming a train of abutment connections connected at its inner end with said reaction member, first and second epicyclic gearing groups each having an input element to torque converting ratio therein, an output element, a reaction element and a system of planetary pinions, said input elements of said first and second gearing groups separated for rotation relative to each other, the input element of the first of said gearing groups fixed to rotate with said first shaft through which individually to be rotated by said driven member of said fluid torque converter, means connecting the input element of said second gearing group directly to said impeller in parallel to the driven member of said fluid torque converter, the reaction element of said first gearing group connected individually to be rotated from the output element of said second gearing group independently of said first shaft, the output element of said first gearing group connected to rotate said second shaft, said train of abutment connections connected at its outer end with said connection between the reaction element of said first gearing group and the output element of said second gearing group, abutment means operable to hold or release either the reaction member of said first gearing group and said train of abutment connections including the reaction member of the fluid torque converter against rotation, or the reaction member of said second gearing group, and means including a clutch operable to lock said train of abutment connections up to said second element of said one-way coupling to rotate with said impeller while continuing said input elements of the first and the second gearing groups for rotation relative to each other unless the hydraulic torque transmitting component coupling said impeller and driven members of the fluid torque converter attains absolute 1 to 1 ratio.

10. In compound power transmission systems, the combination of a driving shaft, a driven shaft, first and second epicyclic gear units each having revolvable input, output, and reaction elements, the output element of the first of said units being fixed to rotate with the reaction element of said second unit, the input elements of said two units being separated normally to rotate relative to each other, means operatively connecting the input element of said first unit to said driving shaft, brake means for selectively restraining the reaction element of one or the reaction element of the other of said two units against rotation, a hydrodynamic power transmission unit having a vaned reaction member and adapted to function either as a fluid torque converter or fluid coupling, means including a one-way coupling device connecting said vaned reaction member to the output element of said first gear unit and the reaction element of said second gear unit, and means operable at will to connect the elements of said first gear unit to rotate as a unit without so effecting the elements of said second gear unit.

11. In a power transmitting system, in combination, a driving shaft, a driven shaft, a fluid coupling including an impeller element, a turbine element and a reaction element, means securing said impeller element to said driving shaft in driving relationship, a differential gear unit having a rotary output element and first and second rotary input elements, means operatively connecting said output element and driven shaft in driving relationship, a one-way clutch operatively connecting said reaction element to said first input element in driving relationship, means operatively connecting said turbine element to the other of said input elements in driving relationship, a second differential gear unit having a rotary output element and first and second rotary input elements, means operatively connecting the output element of said second differential gear unit to the first input element of said first differential gear unit, means operatively connecting said driving shaft to the first input element of said second differential gear unit, and means for selectively holding the first input element of said first differential gear unit and said second input element of said second differential gear unit against rotation.

12. In a power transmitting system, in combination, a driving shaft, a driven shaft, a fluid coupling including an impeller element, a turbine element and a reaction element, means securing said impeller element to said driving shaft in driving relationship, a differential gear unit having a rotary output element and first and second rotary input elements, means operatively connecting said output element and driven shaft in driving relationship, a one-way clutch operatively connecting said reaction element to said first input element in driving relationship, means operatively connecting said turbine element to the other of said input elements in driving relationship, a second differential gear unit having a rotary output element and first and second rotary input elements, means operatively connecting the output element of said second differential gear unit to the first input element of said first differential gear unit, means operatively connecting said driving shaft to the first input element of said second differential gear unit, means for selectively holding the first input element of said first differential gear unit and the second input element of said second differential gear unit against rotation, and means selectively operable at will for connecting the input elements of said second differential gear unit for rotation in unison.

EVERETT R. BURTNETT.

REFERENCES CITED

The following references are of record in the file of this patent:

UNITED STATES PATENTS

| Number | Name | Date |
| --- | --- | --- |
| 2,127,655 | Stromquist | Aug. 23, 1938 |
| 2,135,246 | Yoxall | Nov. 1, 1938 |
| 2,162,785 | Neracher | June 20, 1939 |
| 2,176,138 | Kelley | Oct. 17, 1939 |
| 2,324,713 | McFarland | July 20, 1943 |
| 2,353,905 | Kelley | July 18, 1944 |